Jan. 20, 1970

L. E. HART 3,490,436

AIR CONDITIONING APPARATUS

Filed Feb. 23, 1968

LLOYD E. HART
INVENTOR.

BY Hastings Ackley
and
Walter J. Jagm
ATTORNEYS

Jan. 20, 1970  L. E. HART  3,490,436
AIR CONDITIONING APPARATUS
Filed Feb. 23, 1968                                   2 Sheets-Sheet 2

LLOYD E. HART
INVENTOR.

ATTORNEYS

United States Patent Office 3,490,436
Patented Jan. 20, 1970

3,490,436
AIR CONDITIONING APPARATUS
Lloyd E. Hart, 6505 Aberdeen Ave.,
Dallas, Tex. 75230
Filed Feb. 23, 1968, Ser. No. 707,654
Int. Cl. F24f 3/14; A61l 9/00; C05d 22/00
U.S Cl. 126—113                               9 Claims

ABSTRACT OF THE DISCLOSURE

An air conditioning apparatus for conditioning air by selectively introducing water or an air conditioning agent, such as a germicide, deodorant, medication and the like into air being circulated through a heating system to increase the humidity of the air in a conditioned space when the heating means of the heating system is operated and for introducing the air conditioning agent and operating the air moving means of the heating system at predetermined intervals of time for predetermined periods of time.

---

This invention relates to air conditioning apparatus for use with heating system having an air moving means for circulating air from a conditioned spaced past a heating means for heating the air and back into the conditioned space.

An object of this invention is to provide a new and improved air conditioning means for use with a heating system which operates automatically whenever the heating system is operating and circulating air from a conditioned space past a heating means and back to the conditioned space to inject a mist or spray of water downstream of the heating means to raise the relative humidity of the air in the conditioned space.

Another object is to provide an air conditioning apparatus which has means for operating the air moving means of the heating system and injecting a fine mist or spray of the conditioning agent into the air being circulated by the air moving means at predetermined intervals for predetermined variable periods of time.

Still another object is to provide an air conditioning apparatus having means for preventing the supply of water under pressure to the spray means of the apparatus whenever the apparatus is supplying a conditioning agent to the spray means.

A further object is to provide a new and improved air conditioning apparatus which has a nozzle opening to the air passage means of the heating system downstream of the heating means of the system which heats the air circulated from a conditioned space through the air passage means and back to the conditioned space and having means for selectively supplying water or a conditioning agent, such as a deodorizer, germicide or medication, through a spray nozzle for injection into the air being moved by the air moving means of the system to condition the air within conditioned space.

A still further object is to provide an air conditioning apparatus wherein the conditioning agent is a liquid held under pressure in a container by an inert gas, such as Freon, and the water is supplied from a source of water under pressure.

Another object is to provide an air conditioning apparatus having timer control means operatively associated with a valve controlling flow of the conditioning agent from the container to the nozzle for causing the agent to be injected into the air passage means as a mixture of the agent and the gas at predetermined intervals of time for predetermined periods of time and for operating the air moving means of the heating system during the injection of the conditioning agent into the air passage means and for a period of time after the termination of the injection of the conditioning agent to insure proper uniform dispersion of the conditioning agent in the air in the conditioned space.

Additional objects and advantages of the invention will be readily apparent from the reading of the following description of a device constructed in accordance with the invention, and reference to the accompanying drawings thereof, wherein.

Figure 1:
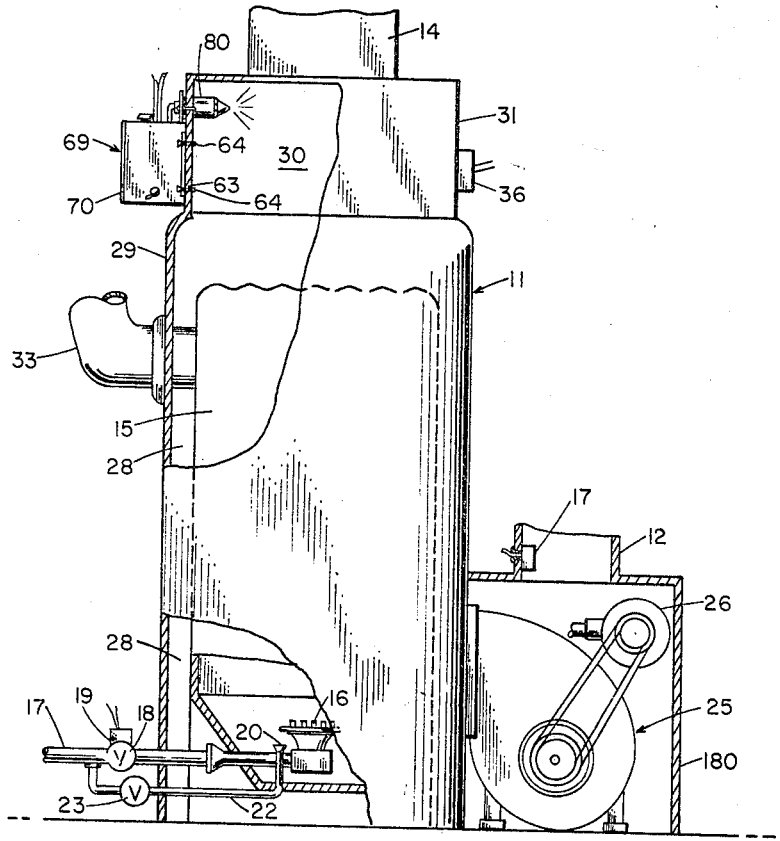
FIGURE 1 is a side vertical view, with some parts broken away, of the furnace of an air heating system provided with the air conditioning means embodying the invention.
Figure 2:
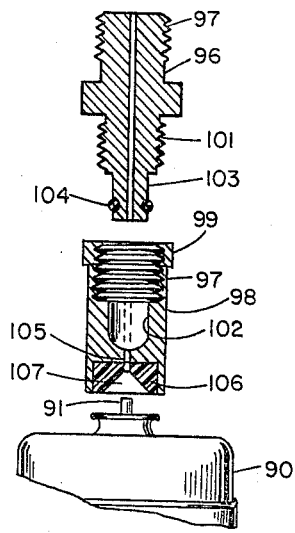
FIGURE 2 is an exploded partly sectional view of the means for connecting the outlet of a pressurized container of the apparatus to a valve.
Figure 3:
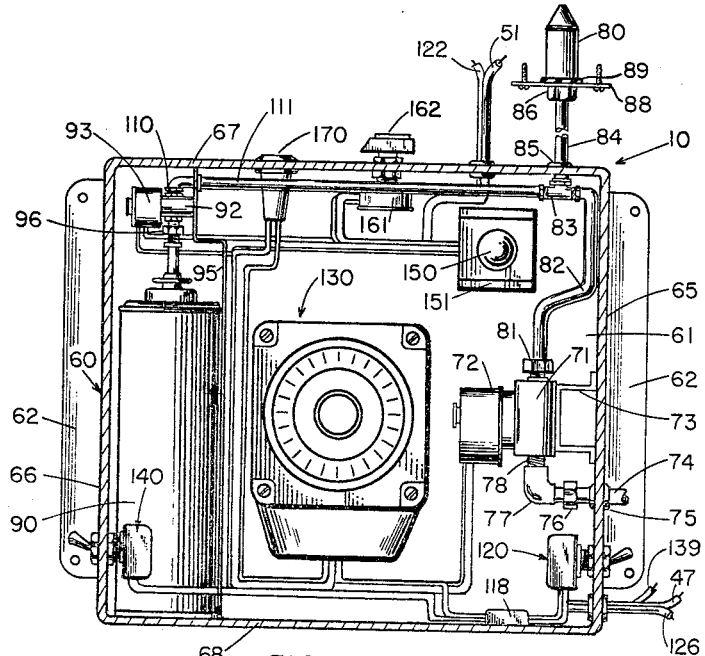
FIGURE 3 is an enlarged vertical sectional view of the air conditioning apparatus.
Figure 4:
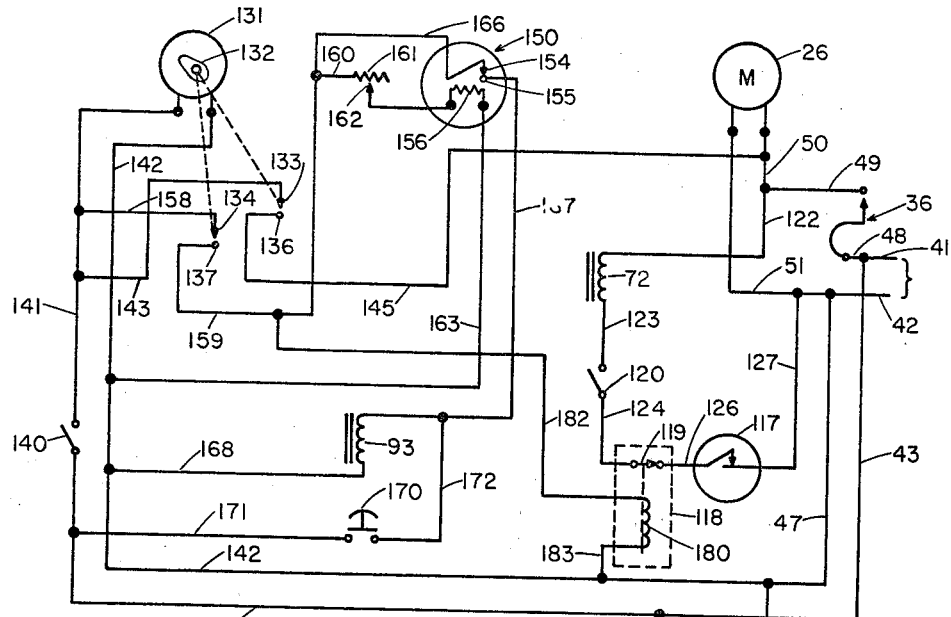
FIGURE 4 is a diagrammatic illustration of the electric control system of the heating system and the air conditioning apparatus.

Referring now to the drawings, the air conditioning apparatus 10 is shown installed on the usual gas fired warm air furnace 11 of a heating system for an enclosed space. The heating system includes an inlet duct 12 through which air is drawn from the building into the warm air furnace, and a delivery duct 14 through which the heated air is recirculated back into the conditioned space. The warm air furnace 11 has the usual fire box or combustion chamber 15 in which a gas burner 16 is positioned and to which the fuel gas is applied through a supply conduit 17. A valve 18 controlled by a solenoid 19 is connected into the fuel supply conduit. A pilot nozzle 20 for igniting the fuel gas supplied to the burner is connected to the fuel supply conduit 17 upstream of the valve 18 by a conduit 22 which may have a manually operable valve 23 connected therein.

The blower 25 of the heating system driven by an electric motor 26 moves air from the inlet duct 12 into the air space 28 between the fire box 15 and the outer housing 29 of the warm air furnace. The air moved by the blower in flowing upwardly through the space 28 is heated and rises into the plenum 30 provided by the bonnet 31 on the upper end of the housing 29 and flows through the plenum to the delivery duct 14 which opens downwardly into the plenum. The exhaust gases from the fire box are conducted to the exterior of the building through an exhaust duct or pipe 33.

The solenoid 19 and the motor 26 of the heating system are automatically controlled in the usual manner by a room thermostat 35 disposed in the conditioned space with which the inlet and outlet ducts 12 and 14 communicate and the usual thermostatic switch 36 which is responsive to the temperature within the plenum 30. The switch 36 is mounted on the bonnet and closes in the usual manner to cause the blower motor 26 to operate when the temperature in the plenum 30 rises to a first predetermined temperature, for example, 120° F. When the temperature in the plenum decreases to a value somewhat lower than the first temperature, for example, 85° F, the thermostatic switch 36 opens to de-energize the blower motor.

The solenoid 19 of the fuel supply valve 18 is energized to open the valve 18 whenever the room thermostat 35 closes being then connected across the main lines 41 and 42, which are connected across a source or input circuit of electric current, by means of the conductors 43, 44 and 45, the room thermostat 35, and the conductors 46 and 47. The blower motor 26 is connected across the main conductors 41 and 42, whenever the switch 36 is closed, by means of the conductors 48, 49, 50 and 51.

It will be apparent that the portion of the electric circuit thus far described is the usual control circuit for a warm air furnace and that in its usual operation, the valve 23 is open and a pilot flame is present at the pilot nozzle so that the fuel gas flowing out of the burner 16 will be ignited thereby when the valve 18 is opened. The valve 18 is opened, of course, when the temperature in the room or conditioned space in which the room thermostat switch 35 is located falls below a predetermined value, the switch 35 closes and the solenoid 19 of the valve 18 is energized. At the time the burner 16 is placed in operation, the blower motor is inoperative and remains inoperative until the air in the plenum 30 is heated to a predetermined temperature, i.e., 120° F., at which time the thermostatic switch 36 closes and connects the blower motor 26 across the main lines 41 and 42. The operation of the blower now causes air to be circulated from such conditioned space through the inlet duct 12 into the space 28 between the fire box 15 and the furnace housing 29, thence upwardly into the plenum 30, and then through the delivery duct 14 back into the conditioned space or room. When the temperature in the room rises above a predetermined value sufficiently high that the thermostatic switch 35 opens, the solenoid 19 is de-energized and the fuel supply valve 18 is closed, thus causing the burner to be extinguished. The blower motor 26, however, will remain energized and continue to circulate air until the temperature in the plenum 30 drops below a second predetermined value, for example, 85° F.

The air conditioning apparatus 10 embodying the invention is used to inject a fine spray or mist of water into the plenum when the furnace burner and the blower motor are in operation and to inject a fine spray or mist of a desired composition into the plenum at predetermined intervals for predetermined periods of time independent of the heating cycle of operation of the heating system and cause operation of the blower motor to cause such composition or agent to be circulated and distributed throughout the air in the conditioned space.

The air conditioning apparatus 10 includes a rectangular box or housing 60 having a vertical wall 61 provided with lateral flanges 62 adapted to abut the bonnet wall 63 and be secured thereto in any suitable manner as by means of screws 64, side vertical walls 65 and 66 which extend perpendicularly outwardly from the vertical wall 61, and top and bottom walls 67 and 68. The open side of the box may be closed by a suitable cover 69 having a peripheral flange 70 which is adapted to telescope about the outer portions of the top, bottom and side walls of the housing 60 and be detachably secured thereto by a friction fit.

The air conditioning apparatus 10 includes a normally closed water supply valve 71 operated by a solenoid 72, mounted by means of a bracket 73 to the side wall 65 of the housing. Water under pressure from a suitable source, such as a municipal water supply system, is supplied to the valve 71 through a supply conduit 74, which extends inwardly into the housing through an aperture in the side wall 65 and a grommet 75, a fitting 76, an elbow 77 and a nipple 78. Preferably, the supply conduit is supplied with hot water from the usual hot water heater of the residence. When the solenoid 72 is energized and opens the water supply valve 71, water under pressure from the conduit 74 is supplied to a spray nozzle 80, which atomizes or disperses the water ejected thereby into the plenum 30 into a fine mist or spray, by means of a fitting 81, a conduit 82, a T-coupling 83, a conduit 84 which extends upwardly through a suitable aperture in the top wall and a grommet 85, and a fitting 86. The nozzle extends into the plenum 30 through a suitable aperture in the bonnet wall 63.

A seal plate 88 is mounted between the nozzle and is adapted to compress an O-ring 89 disposed about the nozzle to seal between the nozzle and the bonnet wall 63 about the aperture in the bonnet wall through which the nozzle extends.

A container 90 is positioned in the housing with its bottom resting on the bottom wall. The container may be of the "Aerosol" dispenser type and have an active agent such as a deodorizer, germicide, medicament, and the like, maintained therein under pressure by a gas, such as Freon, and have a suitable outlet or dispenser member 91 which when it is depressed opens a suitable valve means of the container to permit the flow of the mixture of such gas and agent through the passage of the dispenser member. The container is positioned below a valve 92 which is operable by a solenoid 93. The valve is rigidly secured, as by screws, to a mount plate 95 which extends between the top and bottom walls of the housing and is rigidly secured thereto in any suitable manner, as by welding and the like. When the dispenser member is depressed a mixture of the gas and agent from the container 90 is transmitted to the inlet of the valve 92 by a connector member 96 whose upper threaded end portion 97 is received in the threaded inlet of the valve and its lower threaded portion is received in an adaptor member 98. The adaptor member has enlarged threaded bore portion 99 in which is receivable a lower threaded portion 101 of the connector member 97. The adaptor has a reduced lower bore portion 102 in which is slidably receivable the reduced lower end portion 103 of the connector member 96. An O-ring 104 is disposed in an annular recess of the lower end portion 103 between the connector member and the adaptor member. The adaptor member has a relatively small passage 105 which opens to a seat ring 106 of nylon or the like in whose downwardly opened recess, which provides a conical seat surface 107, is receivable the top end of the dispenser member 91.

It will be apparent that when it is desired to position a container 90 in the housing, the adaptor member is screwed upwardly on the connector member. The container is then positioned on the bottom wall of the housing with its dispenser member 91 in vertical longitudinal alignment with the adaptor member and below its lower end. The adaptor member is then screwed downwardly on the connector member and, as the conical seat surface 108 engages the top end portion of the container dispenser member 91 a fluid tight seal is established between the seat ring and the upper end of the dispenser member 91, and the dispenser member is moved downwardly so that the valve means of such container is opened. If the valve 93 is open the contents of the container will then flow to and through the valve.

The outlet of the valve 93 is connected to the nozzle 80 by a connector or fitting 110, a conduit 111, which extend through a suitable aperture in the plate 95, the T coupling 83 and the conduit 84. The valve 92 is operated by a solenoid. The normally closed valve 92 is opened by the solenoid 93 whenever the latter is energized.

The control circuit for the air conditioning apparatus 10 which causes the solenoid 72 to be connected across the main conductors 41 and 42 when the thermostatic switch 36 is closed, and therefore when the burner 16 is lit and the power motor 26 is energized, may include a humidistat switch 117 over a relay 118 having a normally closed contact 119 and a manually operable switch 120. The humidistat switch may be located in the inlet duct 12 or in the conditioned space itself. When the manual switch 120, the humidistat switch 117 and the blower thermostatic switch 36 are all closed, the solenoid 72 is connected across the main conductors 41 and 42 through the conductor 48, the switch 36, the conductors 49, 122 and 123, the manually operable switch 120, a conductor 124, the relay contact 119, the conductor 126, the humidistat 117 and the conductors 127 and 51.

The control circuit of the air conditioning apparatus 10 for energizing the solenoid 93 of the valve 92 periodically at predetermined time intervals for a predetermined period of time, includes a suitable timer switch or control 130 of the type commercially available from the Paragon Electric Co., Inc., of Two Rivers, Wis., as model No. 8013–0 DPST time control, which has a motor 131 having suitable cam means 132 for actuating its contacts 133 and 134 to move them to closed positions in engagement with its stationary contacts 136 and 137, respectively. The motor 131 of the timer device is connectable across the main conductors 41 and 42 by the conductors 43 and 139, a manually operable switch 140, and the conductors 141, 142, and 47. When the movable contact 133 of the timer device 130 engages the contact 136, the blower motor 26 is connected across the main conductors 41 and 42, even though the lower thermostatic switch 36 may be open, by the conductors 43 and 139, the switch 140, and the conductors 141 and 143, the contacts 133 and 136, and the conductors 145, 50 and 51. The contact 134 of the timer device when moved into engagement with its contact 137 connects a time delay relay across the main conductors 41 and 42. The time delay relay 150 may be of any suitable type, such as one commercially available from Amperite Company, Union City, N.J., as Model No. 1115C30T and which is mountable on a socket 151 secured in any suitable way to the vertical wall 61 of the housing 60. The time delay relay 150 includes a normally closed contact or switch 154 which engages the stationary contact 155 and which is movable to its open position a predetermined period of time after the heater resistance 156 of the relay is initially energized. The heater resistance 156, when the contacts 134 and 137 of the timer device are in engagement, is connected across the main conductors 41 and 42 by the conductors 43 and 139, the manual switch 140, the conductors 141 and 158, the contacts 134 and 137, the conductors 159 and 160, a variable resistance 161 and its movable contact 162, and the conductors 163, 142 and 47. It will be apparent that the contacts 154 and 155 of the thermal time delay relay 150, when in a closed position, connect the solenoid 93 across the main conductors 41 and 42 through the conductors 43 and 139, the manually operable switch 140, the conductors 143 and 158, and the conductors 159, 166, 167, 168, 142 and 47. When the timer device 130 causes the contacts 133 and 134 to move simultaneously to their closed positions, the blower motor 26, the solenoid 93, and the heater resistant 156 are simultaneously energized.

The solenoid 93 may also be energized for testing the apparatus by means of a push-button switch 170 which may be mounted on the top housing wall 67 and which when it is in its closed position connects the solenoid 93 across the main conductors 41 and 42 through the conductors 43, 139, 171, 172, 167, 168, 142 and 47. The variable resistance 161 may also be mounted on the top wall of the housing and the handle 169 of its movable contact 162 is at the exterior of the housing. The timer control 130 is also mounted by suitable screws or bolts on the vertical rear wall 61 of the housing.

In order to prevent the solenoid 72 of the water supply valve 71 from being energized at such times when the contacts 133 and 134 are closed, the winding 180 of the relay 118 is energized to move its contact 119 to open position whenever the contact 134 of the timer device is moved to its closed position. The relay winding 180 is connectable across the main conductors 41 and 42 by the conductors 43, 139, the manual switch 140 and the conductors 141, 158, 159, 182, 183 and 47. When the relay winding 180 is energized it moves its contact 119 to open position and thus prevents the energization of the solenoid 72.

In use the manually operable switches 120 and 140 are closed, the timer control 130 is set to close its contacts at predetermined times of the day, for example, 8 o'clock in the morning and 8 o'clock in the evening, and the movable contact 162 is adjusted to set the length of the period of time the valve 92 will be open each time the contacts 133 and 134 are moved to closed position. Since the contents of the container are under relatively high pressure and of relatively high concentration, the valve 92 must be held open for a relatively short period of time, for example, 10 to 90 seconds to provide the desired treatment or conditioning of the air in the conditioned space at such times of the day which will vary with the particular agent and the total volume of the conditioned space.

Each time the blower motor is energized during the operation of the heating system, the solenoid 72 is also energized, the water valve 71 is opened and a fine mist of water is ejected into the plenum 30 where it vaporizes and is circulated with the air being moved by the blower throughout the conditioned space which is heated by the heating system.

If the timer control 130 is set to cause operation dispensing of the agent of the container 90 at 8 o'clock in the morning and at 8 o'clock in the evening, the contacts 133 and 134 are moved to their closed positions at these times. The movement of the contact 133 to its closed position causes the blower motor 26 to be energized so that the blower immediately begins to circulate air through the conditioned space even though the burner may not be operating. The simultaneous closing of the contact 134 causes the relay winding 180 to be energized and thus prevents the energization of the solenoid 72 of the water supply valve 71 and simultaneously causes the energization of the solenoid 93 since the movable contact 154 of a time delay relay 150 is in its closed position. Energization of the solenoid 93 causes the valve 92 to open and the pressure of the gas in the container causes a suspension of liquid droplets or mist of the germicide, deodorant, or medication in such gas through the nozzle into the plenum for circulation through the conditioned space. The solenoid 93 remains energized for a short predetermined period of time, for example (10, 15 or 20 seconds predetermined by the position of the movable contact 162 of a variable resistance 161. When the predetermined period of time after the movement of the contact 133 to its closed position elapses, the contact 154 of the thermal time delay relay moves to its open position and thus disconnects the solenoid 93 from across the main conductors 41 and 42, thus causing closure of the valve 92 and the injection of the mist into the plenum is arrested. The contacts 133 and 134, however, are still held in their closed position by the timer control 130, so the heater resistance remains energized to maintain the contact 154 of the thermal time delay relay in its open position and the motor continues to operate so that the air is circulated through the conditioned space for a predetermined period of time to insure the very thorough distribution of such agent throughout the air in the conditioned space. At the time of this period of time, the timer control causes the contacts 133 and 134 again to move to their open positions, and the blower motor is de-energized. During this time when the contacts 133 and 134 are in their closed positions, the burner may be operative due to the fact that the temperature has fallen below the value of which the thermostat switch 35 closes, the solenoid 172, however, cannot be energized since the contact 119 is open, and thus only the agent from the container 90 is ejected into the plenum.

It has been found that the relatively high pressure and high velocity flow of the mixture of gas and agent from the container 90 helps clean the nozzle of any deposits which may form thereon due to the evaporation of water so that the nozzle does not require frequent cleaning.

It will be apparent that any small amount of water which may be present in the passage of the conduit 34 is sprayed out through the nozzle by the high pressure flow from the container when the valve 92 is opened and is therefore easily vaporized in the air flowing through the plenum 30 into the delivery duct 14.

It will now be seen that the inlet duct 12 through which air is drawn from a conditioned space, which may be the several rooms of a residence, the housing 180 in which the blower 25 is located, the passage or space 28 between the fire box 15 and the furnace housing, the plenum 30 and the delivery or outlet duct 14 through which the air is returned to the conditioned space constitute an air passage means and that heating means, which may constitute the fire box 15 and the burner 16, are provided for heating air during its movement through this air passage means.

It will further be seen that a spray means, such as the nozzle 80, is provided for injecting a spray of water or a conditioning agent into such air passage means downstream of the heating means.

It will further be seen that the air conditioning apparatus includes control means for selectively causing opening of the valve in a water supply line or conduit connected to the nozzle whenever the blower means of the heating system is in operation during the heating cycle of operation thereof and a control means for opening a valve in the agent supply conduit also connected to the nozzle at predetermined intervals of time for predetermined periods of time and also rendering inoperable the means which open the water valve.

It will further be seen that the operative components of the air conditioning apparatus are easily accessible for maintenance, cleaning or repair and that the conduit 84 is preferably a flexible plastic tube so that the nozzle may be easily disconnected from the heating system for cleaning or replacement.

It will also be apparent that if the heating system is in operation, and the humidistat switch 117 is in closed position so that water is being sprayed into the plenum 30 at the time the timer control 130 causes the simultaneous closure of the contacts 133 and 134, the relay contact 119 is moved to open position and the water supply valve 71 is closed at the moment the valve 92 is opened so that only the gas and agent from the container will be injected into the plenum as long as the contact 133 is in its closed position. If at the time the contact 133 is moved to open position the burner is still operating, and the humidistat is closed the water valve will again be opened.

It will also be apparent that the injection of water will be prevented if the realtive humidity is above the valve at which the humidistat switch 117 is moved to open position, the humidistat switch 117 beling located in the air passage means of the heating system, for example, in the inlet duct 12, downstream of the burned or heating means thereof.

The foregoing description of the invention is explanatory only, and changes in the details of the construction illustrated may be made by those skilled in the art, without departing from the spirit of the invention.

What is claimed and desired to be secured by Letters Patent is:

1. An air conditioning apparatus for use in a heating system which includes air passage means for circulating air from and back to the conditioned space, heating means in the air passage means for heating air circulated therethrough, air moving means for moving air past the heating means, a first electrically controlled circuit including a thermostat responsive to temperature in the conditioned space for operating the heating means while the thermostat is in a heat demand condition, and a second electrically controlled circuit including switch means responsive to the temperature of the air in the air passage means downstream of the heating means to establish operation of the air moving means upon attainment of a predetermined temperature in the air pasage means downstream of the heating means and to terminate the operation of the air moving means when the temperature in the air passage means falls to a lower temperature causing continued operation of the air moving means following termination of operation of the air heating means; said air conditioning apparatus including: spray means for injecting water into the air passage means downstream of the heating means; first valve means controlling water supply to said spray means; first electric control means for said first valve means for opening said first valve means when said air moving means is operative, said spray means comprising a spray nozzle opening to said air passage means downstream of said air heating means; and means for supplying an air conditioning agent to said nozzle at predetermined time intervals for predetermined periods of time and simultaneously operating said air moving means.

2. The air conditioning apparatus of claim 1, wherein said means for supplying an air conditioning agent includes conduit means for connecting said nozzle to a source of said conditioning agent under pressure; second valve means for controlling flow of said conditioning agent from said source to said nozzle; and second electric control means for causing said second valve means to open at predetermined time intervals for predetermined periods of time.

3. The air conditioning apparatus of claim 2, wherein said second electric control means includes means for maintaining said air moving means operative for a period of time after said second valve means closes.

4. The air conditioning means of claim 3, wherein said second electric control means includes means for preventing operation of said first valve means to prevent supply of water to said spray nozzle when said second valve means is open.

5. The air conditioning means of claim 4, wherein said first electric control means includes means responsive to the relative humidity of the air in said air passage means downstream of said heating means for preventing operation of said first valve means when the relative humidity of the air in said conditoned space exceeds a predetermined value.

6. An air conditioning apparatus for use in a heating system which includes air passage means for circulating air from and back to the conditioned space, heating means in the air passage means for heating air circulated therethrough, air moving means for moving air past the heating means, a first electrically controlled circuit including a thermostat responsive to temperature in the conditioned space for operating the heating means while the thermostat is in a heat demand condition, and a second electrically controlled circuit including switch means responsive to the temperature of the air in the air passage means downstream of the heating means to establish operation of the air moving means upon attainment of a predetermined temperature in the air passage means downstream of the heating means and to terminate the operation of the air moving means when the temperature in the air passage means falls to a lower temperature causing continued operation of the air moving means following termination of operation of the air heating means; said air conditioning apparatus including: spray means for injecting water into the passage means downstream of the heating means; first valve means controlling water supply to said spray means; and first electric control means for said first valve means for opening said first valve means when said air moving means is operative, said first electric control means including means responsive to the relative humidity of the air in said air passage means downstream of said heating means for preventing operation of said first valve means when the relative humidity of the air in said conditioned space exceeds a predetermined value; and means for supplying an air conditioning agent to said nozzle at predetermined time intervals for predetermined periods of time and simultaneously operating said air moving means.

7. The air conditioning apparatus of claim 6, wherein said means for supplying air conditioning agent includes conduit means for connecting said nozzle to a source of said conditioning agent under pressure; second valve means for controlling flow of said conditioning agent from said source to said nozzle; and second electric control means for causing said second valve means to open at predetermined time intervals for predetermined periods of time.

8. The air conditioning apparatus of claim 7, wherein said second electric control means includes means for maintaining said air moving means operative for a period of time after said second valve means closes.

9. The air conditioning apparatus of claim 8, wherein said second electric control means includes means for preventing operation of said first valve means to prevent supply of water to said spray nozzle when said second valve means is open.

References Cited

UNITED STATES PATENTS

| | | | |
|---|---|---|---|
| 1,389,804 | 9/1921 | Wrenn | 126—113 |
| 2,075,314 | 3/1937 | Soppes | 126—113 |
| 3,055,066 | 9/1962 | Duncan | 21—74 |
| 3,102,531 | 9/1963 | Gross | 126—113 |
| 3,262,444 | 7/1966 | Davidson | 126—113 |

CHARLES J. MYHRE, Primary Examiner

US. Cl. X.R.

25—74; 236—44